United States Patent
Haladuda et al.

(10) Patent No.: US 9,180,802 B2
(45) Date of Patent: Nov. 10, 2015

(54) RETRACTABLE STRIKER AND SEAT WITH A RETRACTABLE STRIKER

(75) Inventors: Guido Haladuda, Leichlingen (DE); Helmut Jeck, Engelskirchen (DE); David Alexander, Burscheid (DE); Eric B. Michalak, Northville, MI (US)

(73) Assignee: Johnson Controls Technology Company, Holland, MI (US)

( * ) Notice: Subject to any disclaimer, the term of this patent is extended or adjusted under 35 U.S.C. 154(b) by 368 days.

(21) Appl. No.: 13/500,342

(22) PCT Filed: Jan. 27, 2010

(86) PCT No.: PCT/US2010/022187
§ 371 (c)(1),
(2), (4) Date: May 30, 2012

(87) PCT Pub. No.: WO2011/043831
PCT Pub. Date: Apr. 14, 2011

(65) Prior Publication Data
US 2012/0319450 A1 Dec. 20, 2012

Related U.S. Application Data

(60) Provisional application No. 61/248,552, filed on Oct. 5, 2009, provisional application No. 61/260,561, filed on Nov. 12, 2009.

(51) Int. Cl.
*B60N 2/20* (2006.01)
*B60N 2/36* (2006.01)
*B60N 2/22* (2006.01)
(Continued)

(52) U.S. Cl.
CPC .............. *B60N 2/366* (2013.01); *B60N 2/2245* (2013.01); *B60N 2/3011* (2013.01); *B60N 2/01583* (2013.01)

(58) Field of Classification Search
CPC .... B60N 2/3011; B60N 2/366; B60N 2/2245; B60N 2/01583; B60N 2/442
USPC .............. 297/234, 378.12, 378.13; 296/65.16
See application file for complete search history.

(56) References Cited

U.S. PATENT DOCUMENTS

| 4,174,088 A | 11/1979 | Doerre |
| 4,904,003 A * | 2/1990 | Yamazaki et al. ............. 292/126 |

(Continued)

FOREIGN PATENT DOCUMENTS

| DE | 3728872 | 8/1987 |
| DE | 10 2005 011557 B3 | 6/2006 |

(Continued)

OTHER PUBLICATIONS

International Search Report and Written Opinion dated Aug. 31, 2010; for Corresponding PCT Application No. US 2010/022187 filed Jan. 27, 2010.
(Continued)

*Primary Examiner* — Milton Nelson, Jr.
(74) *Attorney, Agent, or Firm* — The Dobrusin Law Firm, P.C.

(57) ABSTRACT

The present invention relates to a retractable striker (1) and a vehicle seat for a vehicle with a retractable striker (1), wherein the retractable striker (1) is arranged on a seat structure (8), wherein the retractable striker (1) is at least partly retractable into the seat structure (8).

5 Claims, 10 Drawing Sheets

(51) Int. Cl.
*B60N 2/30* (2006.01)
*B60N 2/015* (2006.01)

(56) References Cited

U.S. PATENT DOCUMENTS

| | | | |
|---|---|---|---|
| 5,330,146 | A | 7/1994 | Spykerman |
| 5,516,198 | A | 5/1996 | Yokoyama |
| 5,599,066 | A | 2/1997 | Chih |
| 5,685,610 | A | 11/1997 | Minai |
| 6,390,558 | B2 | 5/2002 | Fischer et al. |
| 2008/0061617 | A1* | 3/2008 | Zielinski et al. ......... 297/378.13 |
| 2010/0027977 | A1 | 2/2010 | Muramatsu et al. |
| 2011/0233982 | A1 | 9/2011 | Lindsay |
| 2011/0260518 | A1 | 10/2011 | Scheurer |

FOREIGN PATENT DOCUMENTS

| | | |
|---|---|---|
| EP | 0 425 237 A2 | 5/1991 |
| EP | 1 810 871 A2 | 7/2007 |
| FR | 2 789 637 A1 | 8/2000 |
| FR | 2 815 304 A1 | 4/2002 |
| JP | 60-157336 | 10/1985 |
| JP | 61-145042 | 2/1986 |
| JP | 11-048840 | 2/1999 |
| JP | 2007-230276 | 9/2007 |
| WO | 03/016091 A1 | 2/2003 |
| WO | 2011/043831 A1 | 4/2011 |
| WO | 2012/009515 A1 | 1/2012 |

OTHER PUBLICATIONS

Corresponding PCT Application No. US 2010/022187 filed Jan. 27, 2010; Published as WO 2011/043831 A1 on Apr. 14, 2011.
Co-pending related PCT Application No. US 2011/043976 filed Jul. 14, 2011; Published as WO 2012/009515 A1 on Jan. 19, 2012.
Korean Office Action dated Nov. 29, 2013; Appln. No. 10-2012-7011343.
Japanese Examination Report for Japanese Application No. 2012-533141; dated Aug. 6, 2013.
European Search Report dated May 24, 2013 application No. 10702194.1-1758.

* cited by examiner

RETRACTABLE STRIKER AND SEAT WITH A RETRACTABLE STRIKER

CLAIM OF PRIORITY

The present application claims the benefit of the filing date of U.S. Provisional Application Serial No. 61/248,552 (filed Oct. 5, 2009), and 61/260,561 (filed Nov. 12, 2009), and is a national application based on PCT Application International Application PCT/US2010/022187, filed 27 Jan. 2010 (published as WO02011/043831) and claims the benefit of the filing date of 27 Mar. 2010, all incorporated herein by reference.

FIELD OF THE INVENTION

The present invention relates to a striker and a seat with a striker, which is arranged on a structure for a vehicle.

DESCRIPTION OF THE PRIOR ART

Such a striker and such a seat are known in the prior art, wherein strikers are used for example to connect a backrest with a car body or a car body to a backrest or to connect a segment of the backrest with the car body or to connect segments of the backrest with each other.

Furthermore such strikers can also be positioned on a cushion part of the seat for example to connect the cushion part with the car body or to connect a segment of the cushion part with the car body or to connect segments of the cushion part with each other.

Seats according to the prior art have the disadvantage that protruding strikers are obstacles and therefore dangerous for passengers, e.g. if these strikers are arranged on the backrest of the seat and the backrest is folded forward.

DESCRIPTION OF THE INVENTION AND OF THE DRAWINGS

An object of the present invention is therefore to provide a seat without the disadvantages of the prior art.

The problem is solved by a retractable striker and a seat with a retractable striker that is arranged on a seat structure for a vehicle, wherein the retractable striker is at least partly or fully retracted into the seat structure. The seat structure on which the retractable striker is mounted can either be a backrest or a cushion part of the seat.

The seat according to the present invention is a seat that can be used by at least one person. Especially it is possible to use this seat as a bench seat for more than one person. This seat comprises a cushion part and a backrest.

It is possible according to the present invention that the backrest can be divided into several segments. Especially the whole backrest or one or more segments of the backrest are foldable from a first position to alternative positions. For example, the first position is a driving position, in which passengers may be seated on the seat. Furthermore it is possible that the second position is a storage position. In this storage position the backrest or one or more segments of the backrest are folded onto the cushion part. Preferably the backrest is movable into one or more sittable positions. Preferably the backrest is movable into a "normal" sittable position and into a leaned back and therefore comfortable sittable position. Preferably the backrest is movable into one or more second positions. Preferably the cushion part is movable into one or more positions.

According to another embodiment of the present invention, the storage position can be provided such that the cushion part is moved upward toward the backrest. Especially in the first position, the backrest or the cushion part can be connected by the retractable striker with the car body or the segments of the backrest/cushion part are connected with each other by the retractable striker and a counterpart for the retractable striker.

According to the present invention the retractable striker is at least partly retractable into the seat structure or other structure, so that the retractable striker is not an obstacle to a passenger or an operator.

The retractable striker can be made of any material. Preferably the retractable striker is made of a metal or a strong material with energy absorbing characteristics like steel. More preferably the retractable striker is shaped in the form of a U, hook, notched rod, etc. According to the present invention, the leg(s) of the retractable striker can be of different or similar length.

Preferably the retractable striker comprises a spring or retraction device, wherein the retraction device presents the retractable striker into a protruding position, wherein in this protruding position the retractable striker is engaged with a counterpart. This means that the retraction device is pretensioned to move the retractable striker from its retracted position towards its protruding position in case the retraction device is released.

In a preferred embodiment the retractable striker comprises a stop member, wherein the stop member defines the protruding position.

More preferably the retractable striker is provided movably in a guide sleeve or in a plurality of guide sleeves, especially one guide sleeve for each of the legs of the retractable striker. More preferably the leg(s) of the retractable striker, especially the long leg in case of the retractable-striker having leg(s) of different length (long leg and short leg), is provided movably in the guide sleeve. The guide sleeve guides the retractable striker while moving from the protruding position into the retracted position and from the retracted position into the protruding position.

According to another preferred embodiment of the present invention the retractable striker comprises an actuation means, i.e. a cable or other device. The retractable striker is movable from the protruding position into the retracted position by this actuation means. The actuation means can be used manually or by an actuator or by a motor.

Between the retractable striker and the actuation means an expanding element is preferably provided, especially a spring. The expanding element prevents passengers, especially children, from being hurt when the retractable striker is moved from the protruding position into the retracted position.

Preferably the retractable striker is movable by a movement of the seat structure e.g. by a movement of the backrest or by a movement of the cushion part. More preferably the retractable striker is automatically retracted when the seat structure is moved from the first position towards the second position. For example, if the backrest is folded into a second position, the retractable striker is retracted; the retractable striker is automatically moved into a protruding position when the backrest is moved into a sittable or upright first position.

According to the present invention, the retractable striker is lockable or latchable in at least one first position of the seat structure, especially the backrest. In case the backrest is latchable (with the retractable striker being in the protruding position) in two or more different first positions (hereinafter also called "first position" and "further first position") then it can be advantageous that the retractable striker is retracted while moving the seat structure past one of the two first positions, e.g. past the first position in order to arrive at the further first position. This is preferably the case when the first position is provided in between the second position (in which the retractable striker is in its retracted position) and the further first position. The retraction of the retractable striker when passing the first position (in order to be moved to the further first position) can be realized by any means (e.g. manually or electrically or any other way). By means of such a retraction movement of the striker, it is possible according to this embodiment of the present invention to pass the first position on the way of the seat structure to the further first position. After the seat structure passed the first position (i.e. retractable striker passed the latching means corresponding to the first position), the retractable striker is protruded into protruding position (preferably by spring means) to be latched in the further first position. The first position can be any position in which the retractable striker is latchable. i.e. any storage or sittable or comfort position of the backrest. Also the further first position can be any position in which the retractable striker is latchable. i.e. any storage or sittable or comfort position or more comfortable position of the backrest. This retractibility is principally as well realizable for the seat cushion in the same way and therefore not described here.

In the description of the present invention the first position of the backrest or the seat cushion is one or more position in which the backrest or the seat cushion can be latched, locked or otherwise fixed using the retractable striker. In this context the second position of the backrest or the seat cushion is one or more position in which the retractable striker is retracted into the seat structure.

In the following the invention is explained using FIG. 1 to FIG. 15. The explanations are only exemplary and do not limit the scope of the present invention.

Figure 1A:
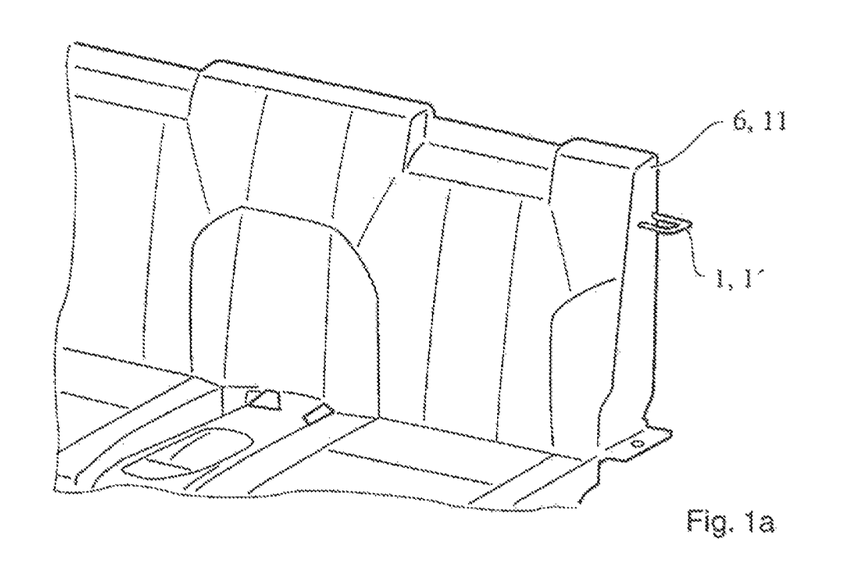
Figure 1B:
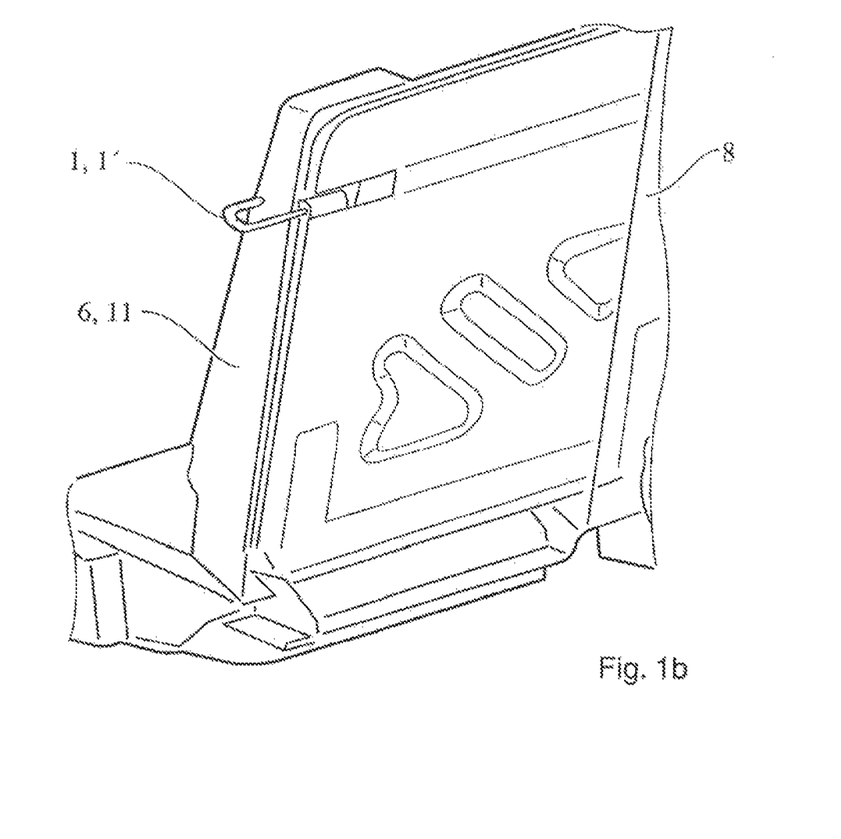

FIGS. 1a and 1b show each a schematic illustration of a seat. In the upper illustration (FIG. 1a) a front view and in the lower illustration (FIG. 1b) a back view of the seat with a backrest 11 and a trim 6 is shown. Additionally in the back view (FIG. 1b) the seat structure 8 is shown. At the side of the seat a retractable striker 1 is arranged. In this shown position the retractable striker 1 is in a protruding position 1', i.e. the retractable striker is in its extended position. The backrest 11 is in the (upright) sittable first position.

Figure 2:
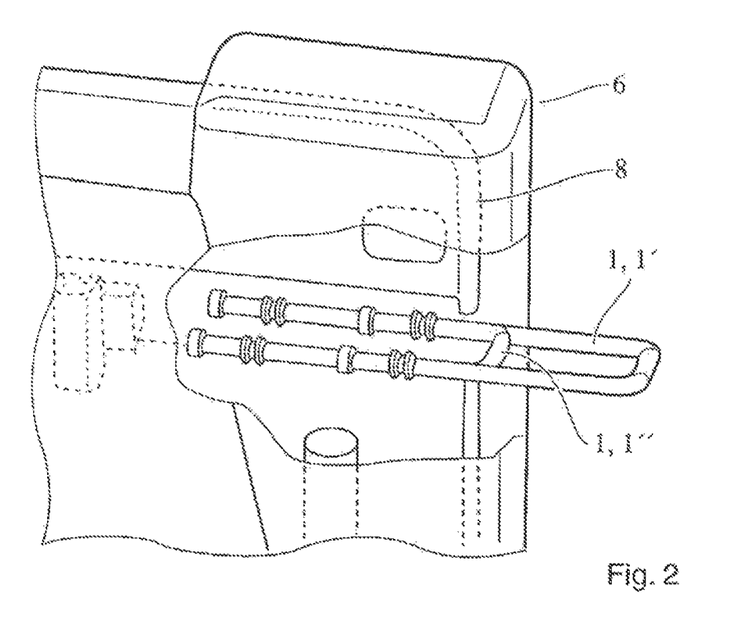
Figure 2A:
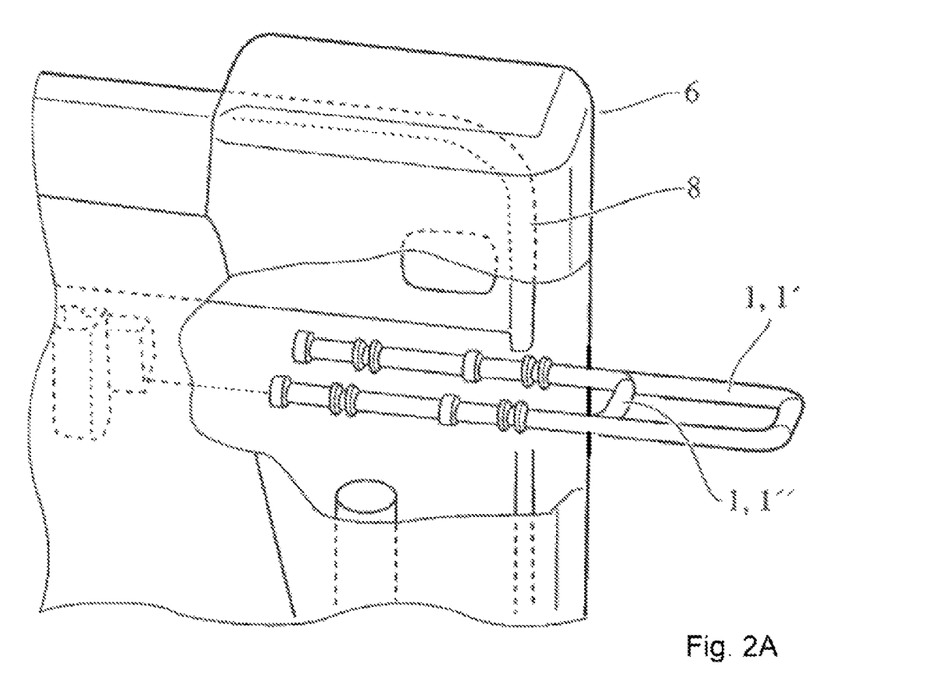

FIG. 2 shows schematically a front view of a part of the seat. The retractable striker 1 is shown in the protruding position 1' and in the retracted position 1". In the retracted position 1" the retractable striker 1 is retracted into the seat system (also called seat structure 8). Preferably, even in the retracted position 1", there is a clearance between the trim 6 and the middle part (i.e. the part which does not constitute the legs of the retractable striker 1) of the retractable, striker 1, as shown in FIG. 2A.

Figure 3:
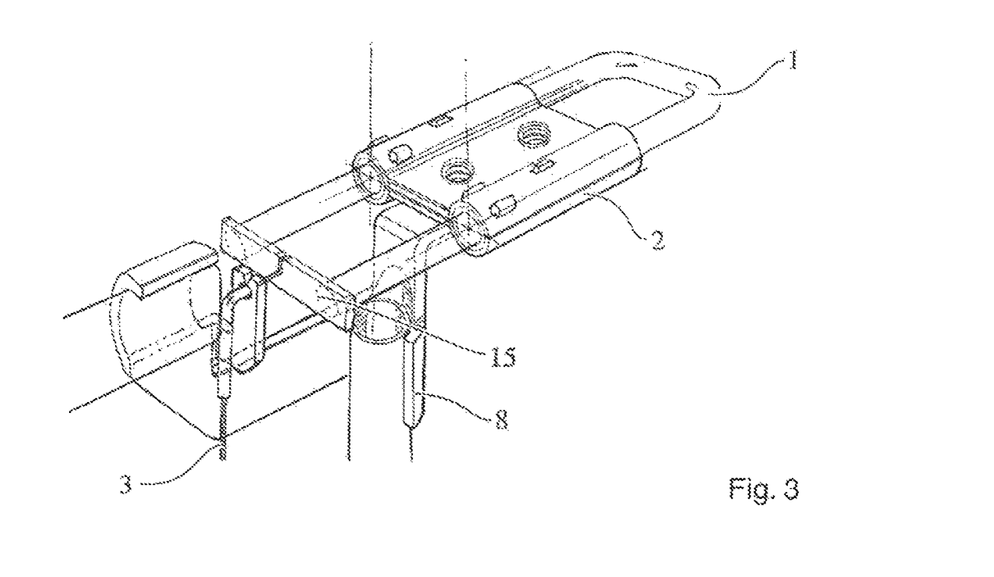

FIG. 3 shows schematically the retractable striker 1 movably guided in a guide sleeve 2. A cable 3 is connected with the retractable striker 1 at a connector plate 15. When the backrest 11 is folded (from the upright first position in the direction of a (mostly forwardly) folded second position) then the cable 3 retracts the retractable striker 1 guided by the guide sleeve 2 from the protruding position 1' towards the seat structure 8 into the retracted position 1".

Figure 4:
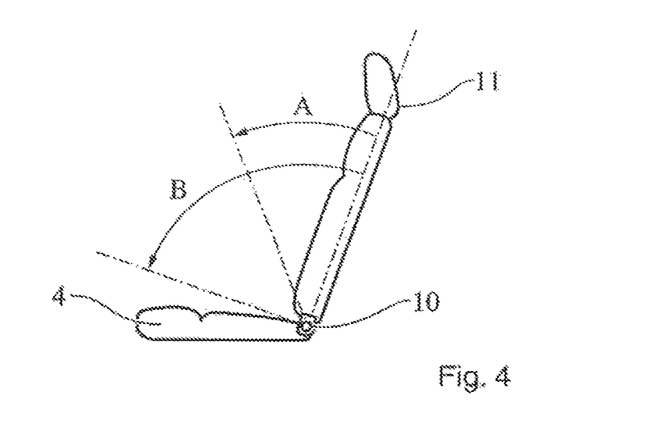

FIG. 4 shows schematically the seat with the backrest 11 in a side view. The backrest 11 is shown in the upright or sittable position (first position). The backrest 11 is foldable towards a seat surface 4 or cushion part 4 into the storage position (second position). An angle B is the angle between the backrest 11 in upright or sittable first position and the backrest in storage position (second position). An angle A is the angle between the backrest 11 in first position and the backrest 11 in an intermediate position. This intermediate position is any position between the first position and the second position.

Figures 5A, 5B, 5C:
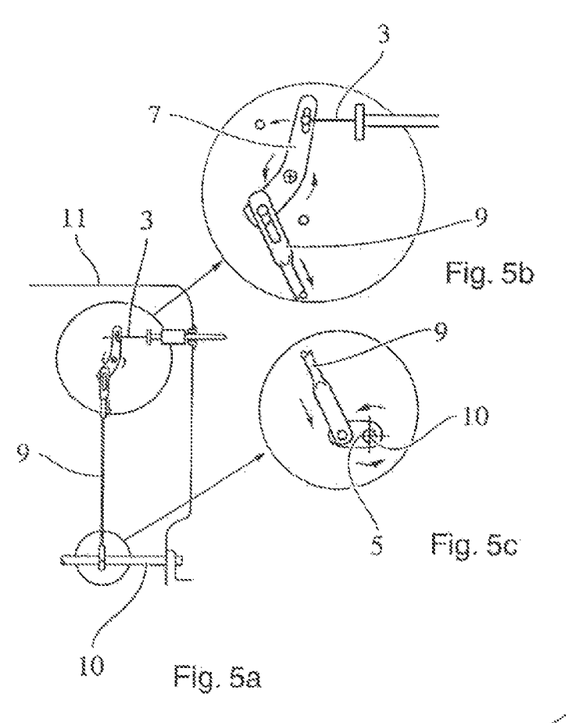

FIGS. 5a, 5b and 5c show exemplarily a further embodiment of the present invention in three schematic illustrations. The left illustration (FIG. 5a) shows the backrest 11 with a seat back pivot 10. The backrest 11 is folded (rotated) about the seat back pivot 10. The upper circled illustration (FIG. 5b) shows a detailed view on the connection between the solid link 9 and the cable 3. The solid link 9 is connected to a two-sided lever 7, which is rotated when the backrest 11 is folded into the storage position (second position). The two-sided lever is connected to the cable 3. The lower circled illustration (FIG. 5c) shows a detailed view of the connection between the seat back pivot 10 and the solid link 9. The seat back pivot 10 is connected with a first pivot lever 5, which is rotated when the backrest 11 is folded into the second position, and the first pivot lever 5 is connected with the solid link 9. If the seat back pivot 10 is rotated then first pivot lever 5 provides an overtravel of the rotation. These connections using the solid link 9 with the two-sided lever 7 and the first pivot lever 5 provide a mechanical transmission device. This realization is advantageous because it is easily possible to provide an overtravel of the travel of the backrest 11 from the driving position (first position) into the folded position (second position).

Figures 6A, 6B, 6C:
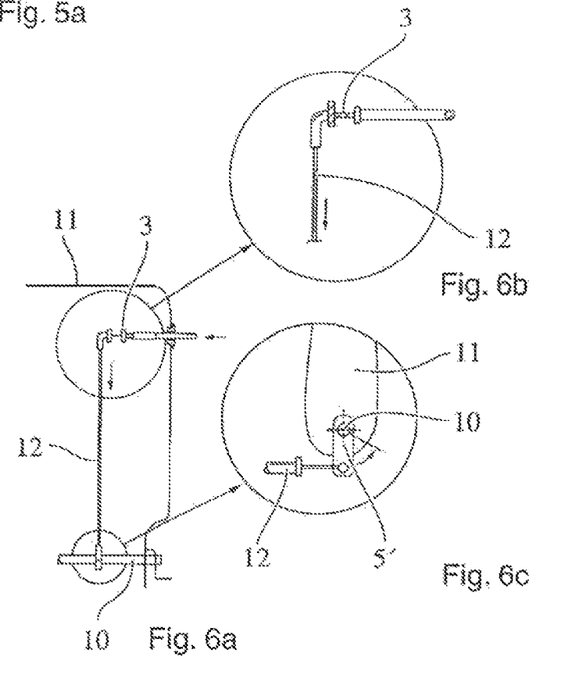

FIGS. 6a, 6b and 6c show exemplarily a further embodiment of the present invention in three schematic illustrations. The left illustration (FIG. 6a) shows the backrest 11 with the seat back pivot 10. The seat back pivot 10 is connected with a cable link 12. The cable link 12 is connected to the cable 3. The upper circled illustration (FIG. 6b) shows a closer view on the connection between the cable link 12 and the cable 3. When the backrest 11 is folded into second position then the cable link 12 is pulled towards the seat back pivot 10 and retracts the cable 3 and the retractable striker 1. The lower circled illustration (FIG. 6c) shows a closer view of the connection between the seat back pivot 10 and the cable link 12. The seat back pivot 10 is connected with a second pivot lever 5', which is rotated when the backrest 11 is folded into the second position, and the second pivot lever 5' is connected with the cable link 12. If the seat back pivot 10 is rotated then second pivot lever 5' provides an overtravel of the rotation. This realization is advantageous because it is easily possible to provide an overtravel of the travel of the backrest 11 from the first position into the second position.

Figure 7:
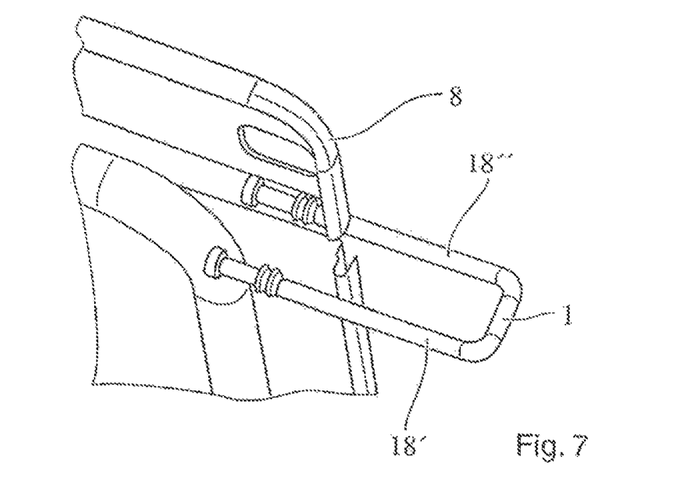

FIG. 7 shows exemplarily a further embodiment o the present invention. FIG. 7 shows schematically a back view of the seat with the seat structure 8 and the retractable striker 1 in protruding position. In FIG. 7 the retractable striker 1 and especially legs 18', 18" of the retractable striker 1 are arranged at a right angle related to the seat structure 8. In other words, the main extension plane of the retractable striker 1 is oriented orthogonal to the seat structure 8.

Figure 8:
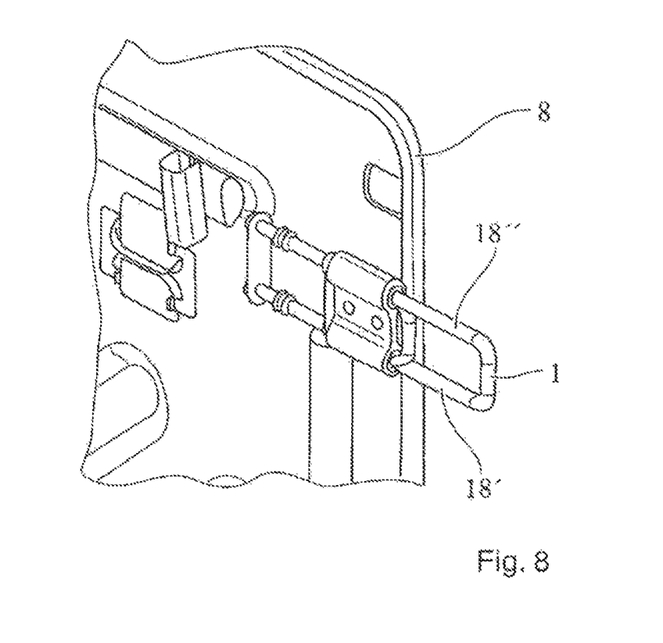

FIG. 8 shows exemplarily a further embodiment of the present invention. FIG. 8 shows schematically a back view of the seat with the seat structure 8 and the retractable striker 1 in protruding position. In FIG. 8 the retractable striker 1 and especially the legs 18', 18" of the retractable striker 1 are arranged parallel related to the seat structure 8. Alternatively it is possible to arrange the retractable striker 1 and especially the legs 18', 18" of the retractable striker 1 in any other angle related to the seat structure 8. In other words, the main extension plane of the retractable striker 1 is oriented parallel to the seat back.

Figure 9:
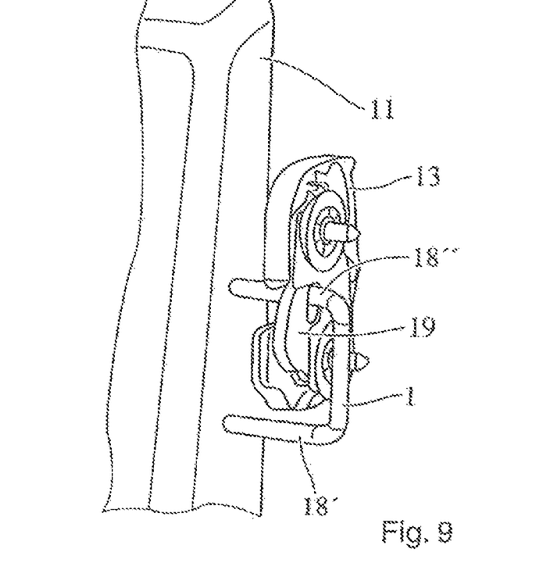

FIG. 9 shows schematically a close front view of the seat back 11 and the retractable striker 1 in protruding position. The retractable striker 1 and especially the legs 18', 18" of the retractable striker 1 are arranged parallel related to the seat structure. A latch mechanism 13 is locked at the retractable striker 1. This latch mechanism 13 possibly connects the seat with a seat segment. A latch 19 locks the leg 18" of the retractable striker 1. The width between the legs 18', 18" is chosen so the latch mechanism 13 easily locks the retractable striker 1. This width between the legs 18', 18" can be chosen flexibly. This flexible arrangement makes it possible to lock the retractable striker 1 with the latch mechanism 13 without arranging the retractable striker 1 and especially the legs 18', 18" of the retractable striker 1 in an angle related to the seat back 11.

Figure 10:
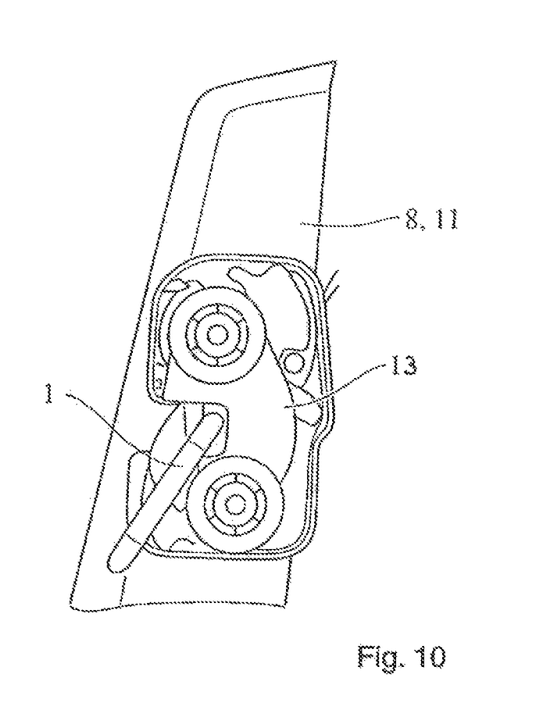

FIG. 10 shows exemplarily a further embodiment of the present invention. FIG. 10 shows schematically a close side view on the seat with the latch mechanism 13 locked with the retractable striker 1. The retractable striker 1 and especially the legs 18', 18" are arranged in an angle about 60° or any other angle related to the seat structure, i.e. neither orthogonal nor parallel to the seat structure 8. Alternatively it is possible to arrange the retractable striker 1 and especially the legs 18', 18" of the retractable striker 1 in any other angle related to the seat structure 8. This flexible arrangement makes it possible to lock the retractable striker 1 with the latch mechanism 13 without changing the width between the legs 18', 18" of the retractable striker 1.

Figure 11:
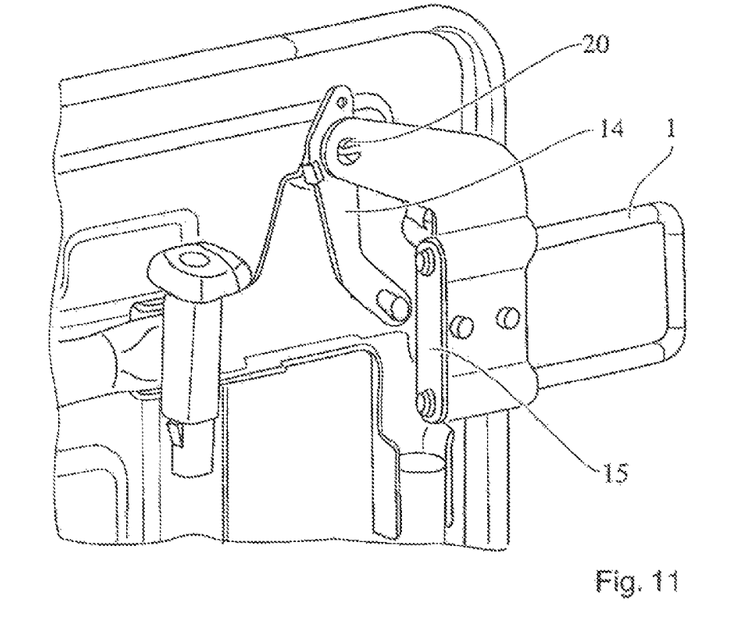

FIG. 11 shows exemplarily a further embodiment of the present invention. FIG. 11 shows a front view of the retracting mechanism according to a further embodiment of the present invention. The retractable striker 1 is connected with a connector plate 15. The connector plate 15 is connected with a striker actuation lever 14. The striker actuation lever 14 is rotatable around a rotary axis 20.

Figure 12:
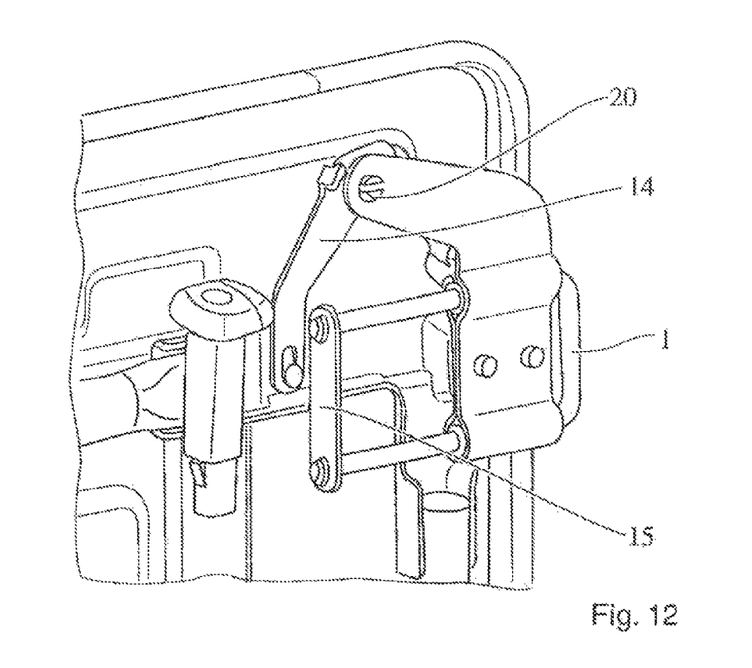

In FIG. 12 it is shown that if the backrest 11 is folded into second position the striker actuation lever 14 is rotated around the rotary axis 20 and retracts the retractable striker 1 towards the seat structure. This realization is advantageous because it is easily possible to provide an overtravel of the travel of the backrest 11 from the first position into the second position.

Figure 13:
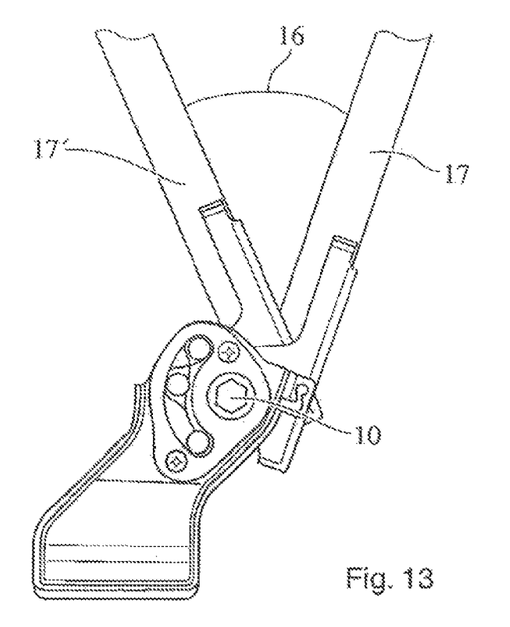
Figure 14:
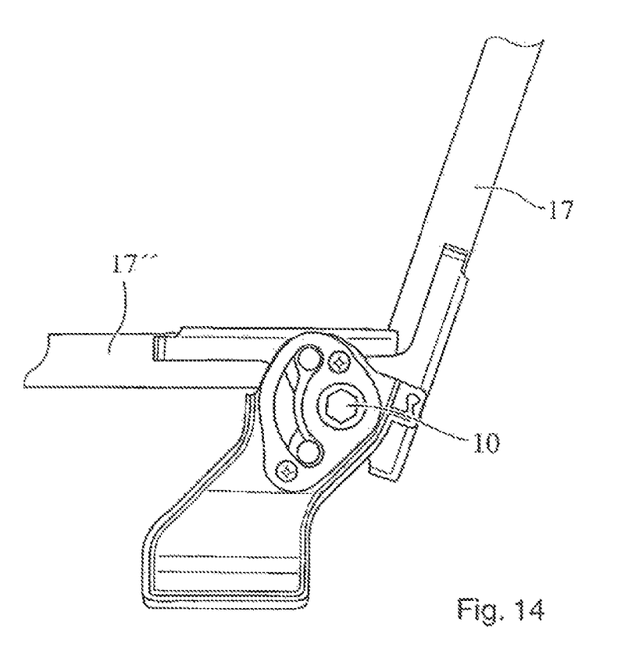

FIGS. 13 and 14 show schematically side views of a backrest structure 17, 17', 17" that reaches parallel to the backrest 11. For better illustration the backrest 11 is not depicted in the FIGS. 13 and 14.

FIG. 13 shows the backrest structure in the first position 17 and the backrest structure in an intermediate position 17'. This intermediate position can be any position between the first position and the second position. Folding angle 16 is the angle between the backrest structure in the first position 17 and the backrest structure in an intermediate position 17'.

FIG. 14 shows the backrest structure in the first position 17 and the backrest structure in the second position 17". Between the intermediate position of the backrest structure 17' and the second position 17" the retractable striker is completely retracted.

Figure 15:
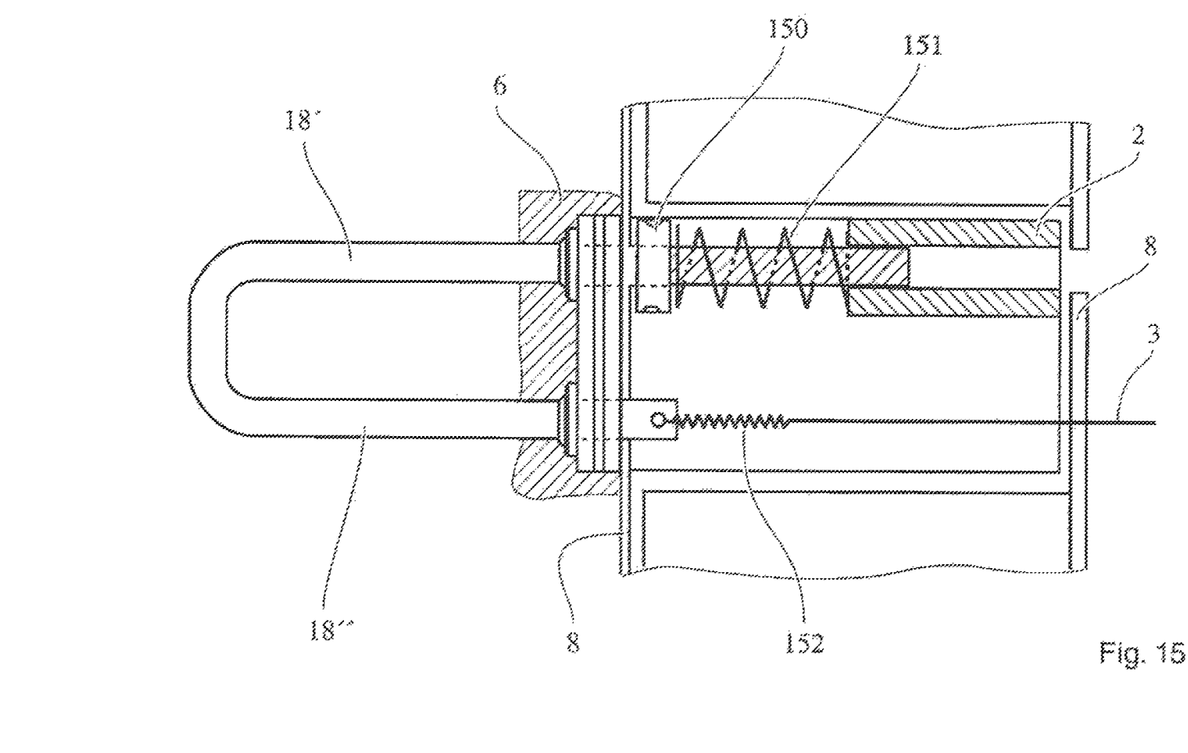

FIG. 15 shows a further embodiment of the present invention The retractable striker 1 is shaped in the form of a U with a base and two legs 18', 18", wherein one of the two legs 18', 18 18" is a long leg 18' and the other leg is a short leg 18". The retractable striker 1 is movably arranged in the seat structure 8 of the backrest of the seat so that the retractable striker 1 is movable into the retracted position. In this retracted position the base of the U is in contact with the trim 6 of the seat. When the retractable striker 1 is moved from the pro ruling position into the retracted position the long leg 18' is provided movably by a guide sleeve 2. Between a stop member 150, which limits the movement of the retractable striker 1, and the guide sleeve 2 a spring 151 is arranged. The spring 151 prestresses the retractable striker 1 into the protruding position. A cable 3 is arranged at the short leg 18" of the retractable striker 1. The cable 3 is used to move the retractable striker 1 from the protruding position into the retracted position, An expanding element 152 is arranged between the retractable striker 1 and the cable 3. The expanding element 152 prevents passengers, especially children and their fingers, from being hurt when the retractable striker 1 is moved from protruding position into retracted position.

Additionally it is possible to combine the embodiments with each other. For example the retracting mechanism using the striker actuation lever 14 can be combined with the arrangement of the retractable striker 1 parallel related to the seat structure 8. But any other combinations are possible and the examples in this description do not limit the scope of the invention.

Although only certain embodiments of the invention have been described herein, it will be understood by any person skilled in the art that other modifications variations and possibilities of the invention are possible without departing from the broader spirit of the invention. Such modifications, variations and possibilities are therefore to be considered as falling within the spirit and scope of the invention and hence forming part of the invention as herein described and/or exemplified.

Accordingly, the specification and drawings are to be regarded in an illustrative sense rather than in a restrictive sense Reference Symbol List 1 retractable striker
1' retractable striker in the protruding position
1" retractable striker in the retracted position
2 guide sleeve
3 actuation means, cable
4 seat surface or cushion part
5 first pivot lever
5' second pivot lever
6 trim (also called soft trim or STO)
7 two-sided lever
8 seat structure
9 solid link
10 seat back pivot
11 backrest (also called seat back)
12 cable link
13 latch mechanism
14 striker actuation lever
15 connector plate
16 folding angle
17 backrest-structure in the first (e.g. driving) position
17' backrest-structure in an intermediate position
17" backrest-structure in the second (e.g. storage) position
18', 18" legs of retractable striker
19 latch
20 rotary axis
150 stop member
151 spring
152 expanding element

The invention claimed is:
1. Vehicle seat for a vehicle with a retractable striker, wherein the retractable striker is arranged on a seat structure, wherein the retractable striker is at least partly retractable into the seat structure and wherein the retractable striker is shaped in a U shape with a base and two legs, wherein a cable is connected with the retractable striker at a connector plate, wherein the cable is configured to retract the retractable striker guided by a guide sleeve from a protruding position toward the seat structure into a retracted position when a backrest of the vehicle seat is folded from an upright sittable first position in a direction of a forwardly folded second position corresponding to a storage position, wherein in the retracted position, the base of the U shape is in contact with a trim of the seat structure.

2. Vehicle seat according to claim 1, wherein the retractable striker is located movably in a guide sleeve.

3. Vehicle seat according to claim 2, wherein the cable is part of an actuation means which is configured to move the retractable striker from the protruding position into the retracted position.

4. Vehicle seat according to claim 3, wherein the backrest is divisible into segments.

5. Vehicle seat according to claim 4, wherein the segments of the backrest are connectable with each other by the retractable striker.

* * * * *